UNITED STATES PATENT OFFICE.

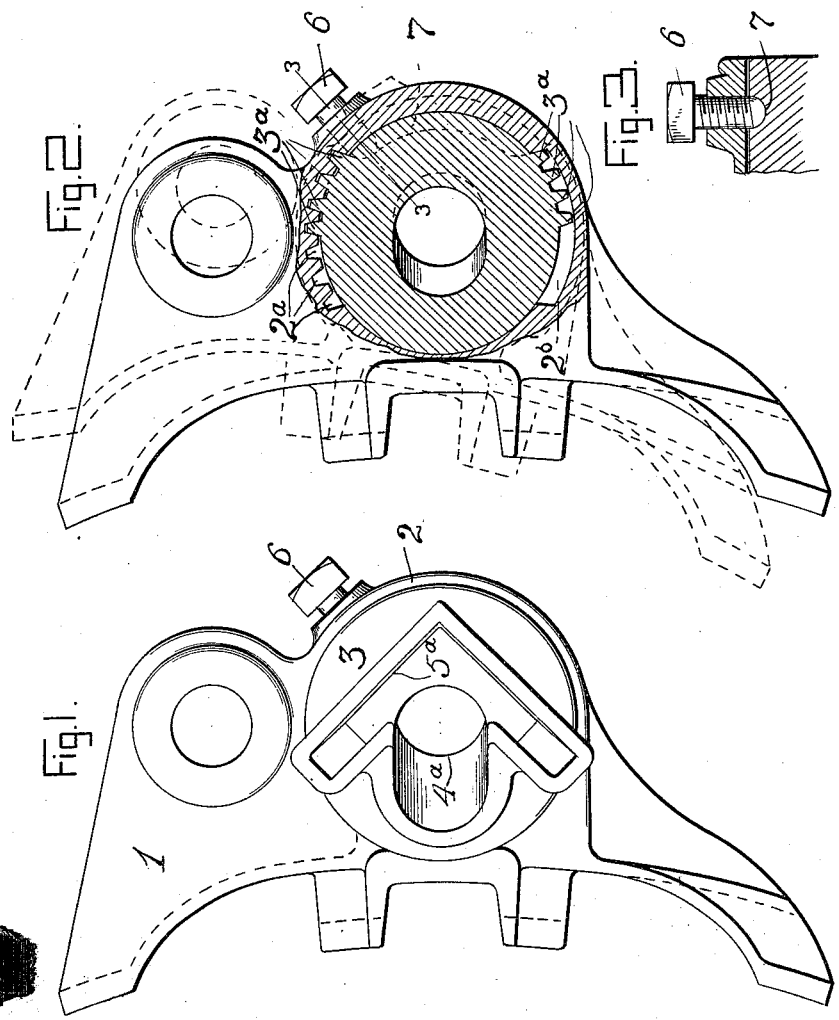

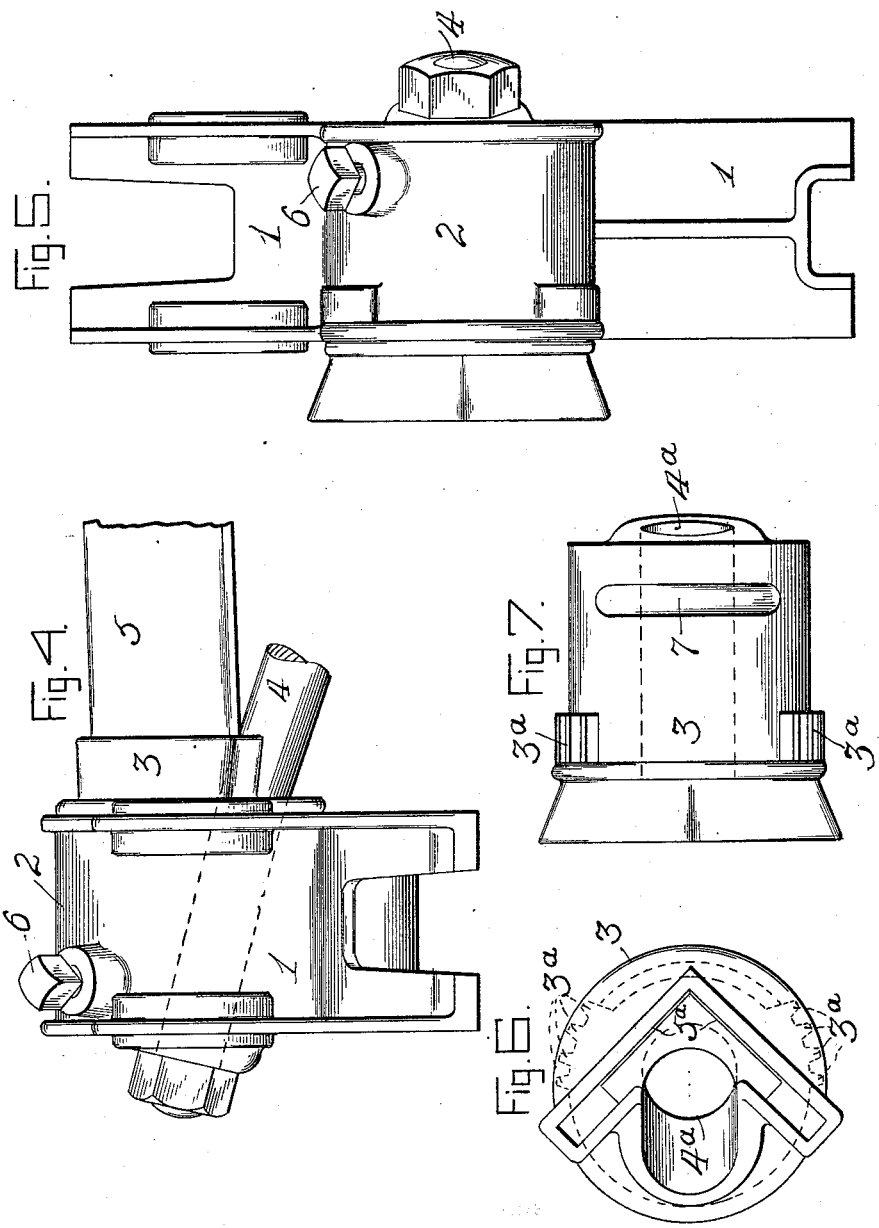

EDWARD D. PUGH, OF CLEVELAND, OHIO, ASSIGNOR TO THE DAMASCUS BRAKE BEAM CO., OF CLEVELAND, OHIO, A CORPORATION OF OHIO.

ADJUSTABLE BRAKE-HEAD.

1,013,311.  Specification of Letters Patent.  Patented Jan. 2, 1912.

Application filed May 28, 1910. Serial No. 564,012.

*To all whom it may concern:*

Be it known that I, EDWARD D. PUGH, a citizen of the United States, and resident of Cleveland, in the county of Cuyahoga and State of Ohio, have invented certain new and useful Improvements in Adjustable Brake-Heads, of which the following is a specification.

This invention relates to a head or brake-shoe carrier for railway brakes, of that class in which provision is made for changing the angular position of the brake head relatively to the brake-beam, in order that the concave face of the brake-shoe may conform to the periphery of the wheel at different heights at which the brake-beam may be hung. In brake-beams of this type, it is desirable to have the brake head so mounted upon the brake beam that it can be angularly shifted in pressing against the wheel, so as to determine the exact position which it should assume in use, and then fixed at the angular adjustment thus determined so that, when in use, the brake head will not shift angularly or vibrate.

The object of the invention is attained by providing the end of the brake-beam (usually consisting of a sleeve fitted to the member or members constituting the beam) and the socket of the brake head, which fits the sleeve, with inter-engaging teeth arranged in segmental series upon the cylindrical surfaces of the sleeve and socket, and sufficient in number to provide for the range of angular adjustment, which is found in practice to be desirable. These teeth extend in the direction of the axis of the sleeve and socket but the short distance necessary to resist the slight turning tendency of the brake head on the beam; a portion of the sleeve and socket being left, sufficient to permit the brake head being placed on the brake-beam and applied to the wheel to determine its angular position before it is pressed to its seat with the teeth in engagement to maintain the adjustment thus determined; suitable means being provided to hold the brake head on the brake-beam after the parts are angularly interlocked. The interlocking parts may be duplicated to avoid multiplication of the members for different ends of the brake-beam, and the securing device may be so disposed as to serve when the brake head is reversed.

The invention will be fully understood upon reference to the accompanying drawings, in which, Figure 1 is an end elevation of the brake head and the sleeve upon which it is fitted; Fig. 2 is a similar view with the brake head socket and the sleeve in section to disclose the inter-engaging teeth; Fig. 3 is a sectional detail view of the securing means; Fig. 4 is a top view of the brake head and a portion of the beam upon which it is fitted: Fig. 5 is a rear view of the brake head and sleeve; and Figs. 6 and 7 are respectively an end view, and a rear elevation of the sleeve, which is applied to the end of the brake-beam members to adapt them to receive the brake head.

1 represents the brake head, which is constructed with a socket 2 and 3 represents the sleeve, which is fitted, in the present illustrative construction, to the tension member 4 and compression member 5 of the brake-beam; said sleeve being constructed with seats $4^a$ and $5^a$, to receive said members.

6 represents a set screw carried by the brake head and 7 is a circumferential groove formed in the sleeve to receive the said set screw and prevent axial displacement of the brake head. In order to maintain the angular adjustment of the brake head, obtained by applying the head to the wheel, the sleeve 3 is provided with a segmental series of teeth $3^a$, which may be duplicated on opposite sides of the sleeve to avoid making right and left sleeves, and the socket 2 is provided with an interior segmental series of teeth $2^a$ on one side and preferably with a recess $2^b$ on the other side. The teeth $2^a$, $3^a$ extend but a short distance in the direction of the axis of the brake head and thus leave a sufficient portion of the cylindrical surface of the sleeve, to receive the socket 2 of the brake head and permit the brake head to be forced against the wheel to determine the necessary angular adjustment. After the angular adjustment is thus determined, the brakes are eased sufficiently to permit the head to be forced axially inward to its seat, which brings the teeth $2^a$ and $3^a$ into engagement and interlocks the brake head and beam against further relative angular movement. The members are secured in this position by screwing in the set screw 6 until it is seated in the groove 7. The groove 7 is of sufficient circumferential length to receive the set screw 6 at different angular positions of the brake head. Obviously, with the teeth 3ª at the inner end only of the sleeve 3, the teeth 2ª as well as the diametrically opposed recess 2ᵇ might be formed at both ends of the socket 2, in order to enable the head to be applied to either end of the brake-beam, in which event, the set screw 6 and the groove 7 would be placed in the middle vertical plane of the brake head. Or it is obvious that, if the teeth 3ª are provided on but one side of the sleeve 3 so that the brake-beam will be rotated upon its longitudinal axis in order to present it in opposite horizontal directions, the socket 2 would in that case have teeth both above and below so as to receive the teeth 3ª in either position of the brake-beam.

I claim:—

1. A railway brake head and a member upon which it is mounted, having an adjusting bearing which permits of relative axial movement and relative rotary adjustment between them, and an interlocking bearing by which the parts are brought into angularly fixed engagement by said axial movement.

2. A railway brake head and a member upon which it is mounted, having both adjusting and interlocking bearings, the adjusting bearing being established by a partial relative axial movement between the parts and the interlocking bearing being established by a further axial movement between the parts.

3. A railway brake head, and a part upon which it is mounted, constructed with a rotary bearing and a bearing interlocking against rotary movement, said parts being assembled by successive axial movements; the rotary bearing being located to bring the brake shoe opposite the periphery of the wheel without engagement of the interlocking bearing, and said interlocking bearing being beyond the rotary bearing in the direction of assembling and being constructed to permit of assembling.

4. In a railway brake, the combination of the beam member having a cylindrical portion formed with a plurality of segmental interlocking elements, and a brake head having a cylindrical bearing surface and interlocking elements complementary to said elements on the beam member, said cylindrical bearing surfaces and interlocking elements having dimensions permitting of substantially slight relative axial movement between the parts to effect adjustment, and locking engagement thereof.

5. In a railway brake, the combination of the brake-beam member having the cylindrical portion and a segmental series of teeth and a brake head having a cylindrical bearing adapted to receive the cylindrical portion of the brake-beam member and having teeth adapted to engage the teeth thereon; the teeth on the respective members being located to come into engagement only when the brake head is seated upon the brake-beam member.

6. As a new article of manufacture, a brake head having a bearing socket provided with locking means circumferentially multiplied and restricted in dimension to a portion of the axial dimension of the socket whereby the brake head may be partially assembled by axial movement, then rotated to effect angular relation and then fully seated by a further axial movement to hold its angular relation so determined.

The foregoing specification signed at Cleveland, Ohio, this 26th day of May, 1910.

EDWARD D. PUGH.

In presence of—
P. T. HANDIGES,
C. R. WAGNER.

Copies of this patent may be obtained for five cents each, by addressing the "Commissioner of Patents, Washington, D. C."